(12) United States Patent
Ichihara et al.

(10) Patent No.: US 12,038,662 B2
(45) Date of Patent: Jul. 16, 2024

(54) OPTICAL ELEMENT

(71) Applicant: FUJIFILM Corporation, Tokyo (JP)

(72) Inventors: Nobuhiko Ichihara, Minamiashigara (JP); Hirofumi Toyama, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 78 days.

(21) Appl. No.: 17/701,033

(22) Filed: Mar. 22, 2022

(65) Prior Publication Data

US 2022/0214576 A1 Jul. 7, 2022

Related U.S. Application Data

(63) Continuation of application No. PCT/JP2020/036008, filed on Sep. 24, 2020.

(30) Foreign Application Priority Data

Sep. 27, 2019 (JP) .................. 2019-177192

(51) Int. Cl.
*G02F 1/137* (2006.01)
*G02F 1/1337* (2006.01)
(52) U.S. Cl.
CPC .... *G02F 1/13718* (2013.01); *G02F 1/133711* (2013.01)
(58) Field of Classification Search
CPC ........... G02F 1/13718; G02F 1/133711
USPC ........................................ 349/115
See application file for complete search history.

(56) References Cited

U.S. PATENT DOCUMENTS

| 2005/0249257 | A1 | 11/2005 | Leyrer et al. |
| 2009/0310221 | A1 | 12/2009 | Aschwanden |
| 2010/0188617 | A1 | 7/2010 | Sakai et al. |
| 2012/0021142 | A1* | 1/2012 | Lee ................... G02F 1/133636 522/42 |
| 2018/0239214 | A1 | 8/2018 | Ji et al. |
| 2020/0257153 | A1* | 8/2020 | Robinson ............. G02B 5/0278 |
| 2021/0048696 | A1* | 2/2021 | Fang ................. G02F 1/133502 |

(Continued)

FOREIGN PATENT DOCUMENTS

| JP | 2-504556 A | 12/1990 |
| JP | 9-280967 A | 10/1997 |

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/036008, dated Apr. 7, 2022.

(Continued)

*Primary Examiner* — Charles S Chang
(74) *Attorney, Agent, or Firm* — Birch, Stewart, Kolasch & Birch, LLP

(57) ABSTRACT

Provided is a new optical element that can be used for various applications. The optical element includes: a liquid crystal layer where a liquid crystal compound is aligned; and a polymer layer that is laminated on the liquid crystal layer, in which the optical element is reversibly switchable between a reference form and a first form where a film thickness distribution of the liquid crystal layer is less than that of the reference form.

11 Claims, 3 Drawing Sheets

(56) References Cited

U.S. PATENT DOCUMENTS

2022/0264076 A1* 8/2022 Makinen ............... G02B 30/26
2023/0093121 A1* 3/2023 Abdulhalim .......... E06B 3/6722
                                                                                     349/16

FOREIGN PATENT DOCUMENTS

| JP | 2005-536898 A | 12/2005 |
| JP | 4928608 B2 | 5/2012 |
| JP | 2020-131638 A | 8/2020 |
| WO | WO2019/189444 A1 | 10/2019 |

OTHER PUBLICATIONS

International Search Report (Form PCT/ISA/210) for International Application No. PCT/JP2020/036008, dated Dec. 15, 2020, with English translation.

* cited by examiner

OPTICAL ELEMENT

CROSS-REFERENCE TO RELATED APPLICATIONS

This application is a Continuation of PCT International Application No. PCT/JP2020/036008 filed on Sep. 24, 2020, which claims priority under 35 U.S.C. § 119(a) to Japanese Patent Application No. 2019-177192 filed on Sep. 27, 2019. The above application is hereby expressly incorporated by reference, in its entirety, into the present application.

BACKGROUND OF THE INVENTION

1. Field of the Invention

The present invention relates to a new optical element including a liquid crystal layer.

2. Description of the Related Art

In a display such as a liquid crystal display, in general, a viewing angle is required to be as wide as possible such that an appropriate image can be observed even during observation from any direction.

On the other hand, in a personal-use electronic apparatus, for example, a tablet personal computer (PC), a laptop PC, or a mobile phone such as a smartphone, a screen is desired not to be peeped by other people. Therefore, in the electronic apparatus, the viewing angle of the screen is narrowed such that the screen is prevented from being peeped.

The viewing angle of the tablet PC or the like is narrowed, for example, by bonding a louver film to a display surface of a display, the louver film being obtained by arranging light shielding walls called a louver that shields light traveling in an oblique direction.

However, in a case where the viewing angle of the display is narrowed using this method, a narrow viewing angle from a specific direction is fixed. Therefore, in a case where an image is displayed at a typical wide viewing angle, it is necessary to remove the louver film.

That is, in a case where the louver film is used, in order to switch between image display at a typical wide viewing angle and image display at a narrow viewing angle, it is necessary to attach or detach the louver film to or from the display surface, which is troublesome.

Correspondingly, in the electronic apparatus such as a tablet PC or a laptop PC, various devices that can switch between image display at a typical wide viewing angle and image display at a narrow viewing angle for preventing peeping from an oblique direction are disclosed.

For example, JP4928608B discloses a liquid crystal display including a viewing angle control film and a viewing angle control liquid crystal panel that are disposed on a display surface of a liquid crystal panel for display where a liquid crystal cell is interposed between polarizing plates, the viewing angle control film including a retardation plate and a first polarizer, and the viewing angle control liquid crystal panel including liquid crystal cells and a second polarizer.

In the liquid crystal display, the first polarizer of the viewing angle control film and the second polarizer of the viewing angle control liquid crystal panel are provided to be interposed between the liquid crystal cells of the viewing angle control liquid crystal panel.

In addition, the emission-side polarizing plate, the first polarizer, and the second polarizer of the liquid crystal panel for display are arranged in a so-called parallel nicols state where directions of transmission axes (absorption axes) match with each other.

Further, examples of the retardation plate include a negative C-plate.

In this liquid crystal display, by applying a voltage to the liquid crystal cell of the viewing angle control liquid crystal panel, the alignment state of a liquid crystal compound in the liquid crystal cell is switched to change a total retardation of the viewing angle control liquid crystal panel and the viewing angle control film. In the liquid crystal display described in JP4928608B, this retardation is changed to switch between a display state at a typical wide viewing angle and a display state at a narrow viewing angle.

SUMMARY OF THE INVENTION

The display described in JP4928608B as a single device can switch between image display at a typical wide viewing angle and image display at a narrow viewing angle without attaching or detaching any member thereto or therefrom.

However, in the display described in JP4928608B, a change in retardation at a narrow viewing angle is uniform on the entire surface. Therefore, in the display, in a case where an image is observed from an oblique direction at a narrow viewing angle, the image may be visually recognized to be thin depending on the image to be displayed, an environment where the image is observed, the observation distance of the image, and the like.

An object of the present invention is to provide a new optical element that can be used in various applications.

By using this optical element together with a liquid crystal cell in order to switch between display at a typical viewing angle and display at a narrow viewing angle in a liquid crystal display, the visibility of an image observed from an oblique direction in a narrow viewing angle state can be more suitably reduced as compared to a method in the related art, and the visibility in a narrow viewing angle state can also be switched.

In order to achieve the object, an optical element according to an aspect of the present invention has the following configurations.

[1] An optical element comprising:
  a liquid crystal layer where a liquid crystal compound is aligned; and
  a polymer layer that is laminated on the liquid crystal layer,
  in which the optical element is reversibly switchable between a reference form and a first form where a film thickness distribution of the liquid crystal layer is less than that of the reference form.

[2] The optical element according to [1],
  in which the film thickness distribution of the liquid crystal layer in the reference form satisfies "1.03<(in-plane maximum film thickness/in-plane minimum film thickness)<100".

[3] The optical element according to [1] or [2],
  in which in a case where the film thickness distribution of the liquid crystal layer in the reference form is represented by A and the film thickness distribution of the liquid crystal layer in the first form is represented by B, "1.1<A/B<100" is satisfied.

[4] The optical element according to any one of [1] to [3],
  in which a film thickness of the polymer layer is 0.01 to 100 µm.

[5] The optical element according to any one of [1] to [4], in which in the liquid crystal layer, the liquid crystal compound is cholesterically aligned.

[6] The optical element according to [5], in which depending on the film thickness distribution of the liquid crystal layer, as the film thickness of the liquid crystal layer increases, a helical pitch of the cholesterically aligned liquid crystal compound increases.

[7] The optical element according to [6], in which in uneven portions adjacent to each other, a ratio of a helical pitch of convex portions to a helical pitch of concave portions satisfies "1.05<(convex portions/concave portions)<100".

[8] The optical element according to any one of [1] to [4], in which in the liquid crystal layer, the liquid crystal compound is homogeneously aligned.

[9] The optical element according to any one of [1] to [8], in which the liquid crystal layer has unevenness on only one main surface in the reference form.

According to an aspect of the present invention, a new optical element that can be used in various applications can be provided.

By using the optical element according to the aspect of the present invention together with, for example, a liquid crystal cell, the optical element can switch between display at a typical viewing angle and display at a narrow viewing angle in a liquid crystal display, the visibility of an image observed from an oblique direction in a narrow viewing angle state can be more suitably reduced as compared to a method in the related art, and the visibility in a narrow viewing angle state can also be switched.

DESCRIPTION OF THE PREFERRED EMBODIMENTS

Hereinafter, an optical element according to an embodiment of the present invention will be described in detail based on preferable embodiments shown in the accompanying drawings.

In the present specification, numerical ranges represented by "to" include numerical values before and after "to" as lower limit values and upper limit values.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm. In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light. Further, although not limited thereto, infrared light refers to invisible light in a wavelength range of longer than 780 nm and 2000 nm or shorter.

Figure 1:
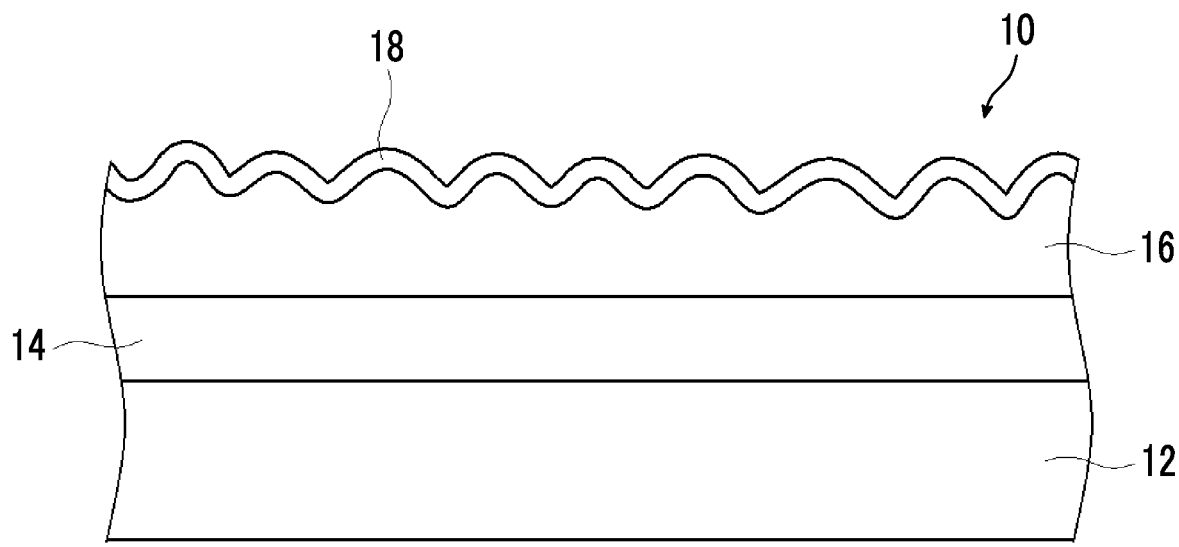
FIG. 1 is a diagram conceptually showing an example of an optical element according to the present invention.

FIG. 1 is a diagram conceptually showing an example of the optical element according to the embodiment of the present invention.

An optical element 10 according to the embodiment of the present invention shown in FIG. 1 includes a support 12, an alignment film 14, a liquid crystal layer 16, and a polymer layer 18 from below in the drawing.

FIG. 1 illustrates a state where the optical element 10 according to the embodiment of the present invention is in a reference form. The optical element 10 according to the embodiment of the present invention is reversibly switchable between the reference form shown in FIG. 1 and a first form where a film thickness distribution (in-plane film thickness distribution) of the liquid crystal layer 16 is less than that of the reference form.

In the optical element 10 shown in the example of the drawing, in a case where the liquid crystal layer 16 is in the reference form shown in FIG. 1, a surface (main surface) on a side in contact with the alignment film 14, that is, a surface on the support 12 side is flat, and an opposite surface (main surface), that is, a surface on a side in contact with the polymer layer 18 has unevenness. The main surface is a maximum surface of a layer (a sheet-shaped material, a film, a plate-shaped material, or a layer).

In FIG. 1, the surface of the liquid crystal layer 16 having unevenness is wave-like in the horizontal direction in the drawing. However, this unevenness is also formed in the direction perpendicular to a plane in the drawing. That is, the surface of the liquid crystal layer 16 having unevenness has irregular unevenness in a two-dimensional shape in a plane direction.

In the following description, the surface of the liquid crystal layer 16 having unevenness will also be simply referred to as "uneven surface".

In the optical element 10 according to the embodiment of the present invention, the liquid crystal layer 16 is a layer where a liquid crystal compound is aligned. In this case, in the liquid crystal layer 16 of the optical element 10 according to the embodiment of the present invention, the liquid crystal compound is not crosslinked (cured). In addition, the polymer layer 18 has an unevenness shape along the uneven surface of the liquid crystal layer 16. Therefore, the liquid crystal layer 16 and the polymer layer 18 of the optical element 10 are reversibly stretchable/contractible in the plane direction.

In the optical element 10, by stretching the liquid crystal layer 16 in the plane direction, the unevenness on the uneven surface, that is, the film thickness distribution can be reduced and preferably can be flattened. As a result, the optical element 10 is reversibly switchable between the reference form where the liquid crystal layer 16 has unevenness, that is, the film thickness distribution is large and the first form where the unevenness, that is, the film thickness distribution of the liquid crystal layer 16 is less than that of the reference form.

The optical element 10 according to the embodiment of the present invention includes the liquid crystal layer 16 that has the above-described unevenness, that is, the film thickness distribution and is reversibly switchable between the reference form and the first form. As a result, the optical element 10 can be suitably used for various applications.

In the optical element 10, the support 12 supports the alignment film 14, the liquid crystal layer 16, and the polymer layer 18.

As the support 12, various sheet-shaped materials (films or plate-shaped materials) can be used as long as they can support the alignment film 14, the liquid crystal layer 16, and the polymer layer 18.

The support 12 may have a monolayer structure or a multi-layer structure.

In a case where the support 12 has a monolayer structure, examples thereof include supports 12 formed of glass, triacetyl cellulose (TAC), polyethylene terephthalate (PET), polycarbonates, polyvinyl chloride, acryl, polyolefin, and the like. In a case where the support 12 has a multi-layer structure, examples thereof include a support including: one of the above-described supports having a monolayer structure that is provided as a substrate; and another layer that is provided on a surface of the substrate.

In addition, the support 12 may be formed of a material having stretchability (elasticity).

The thickness of the support 12 is not particularly limited and may be appropriately set depending on the use of the optical element 10, a material for forming the support 12, and the like in a range where the alignment film 14, the liquid crystal layer 16, and the polymer layer 18 can be supported.

The thickness of the support 12 is preferably 1 to 2000 μm, more preferably 3 to 500 μm, and still more preferably 5 to 250 μm.

The alignment film 14 is formed on one surface (main surface) of the support 12.

The alignment film 14 aligns the liquid crystal compound of the liquid crystal layer 16 in a predetermined state.

In the optical element 10 according to the embodiment of the present invention, as the alignment film 14, various well-known alignment films that are used for alignment of liquid crystal compounds in various liquid crystal layers (liquid crystal compound layers) can be used without any particular limitation. Examples of the alignment film include an alignment film obtained by rubbing a film formed of an organic compound, an obliquely deposited film formed of an inorganic compound, a film having a microgroove, a photo-alignment film that emits polarized light or non-polarized light to a photo-alignable material, and a film formed by lamination of Langmuir-Blodgett (LB) films formed with a Langmuir-Blodgett technique.

Examples of the organic compound for forming the alignment film obtained by a rubbing treatment include a resin such as polyimide, polyvinyl alcohol, polyester, polyarylate, polyamide imide, polyether imide, polyamide, or modified polyamide. In addition, examples of the organic compound for forming the LB film include w-tricosanoic acid, dioctadecylmethylammonium chloride, and methyl stearate.

The thickness of the alignment film 14 is not particularly limited. The thickness with which a required alignment function can be obtained may be appropriately set depending on the material for forming the alignment film 14. The thickness of the alignment film 14 is preferably 0.01 to 5 μm and more preferably 0.05 to 2 μm.

In the optical element according to the embodiment of the present invention, for example, by rubbing a surface of the support 12 formed of a resin without providing the alignment film 14, the support 12 may action as the alignment film.

The liquid crystal layer 16 is formed on the alignment film 14. The liquid crystal layer 16 is a layer that mainly exhibits an optical function in the optical element 10 according to the embodiment of the present invention.

The liquid crystal layer 16 is a liquid crystal layer where the liquid crystal compound is aligned but is not crosslinked, that is, not cured. In the reference form shown in FIG. 1, the liquid crystal layer 16 has unevenness on the surface on the polymer layer 18 side. That is, the liquid crystal layer 16 has the film thickness distribution in the reference form.

In addition, the liquid crystal layer 16 that is not cured is stretchable in the plane direction together with the polymer layer 18 having an unevenness shape along the uneven surface of the liquid crystal layer 16. By stretching the liquid crystal layer 16 in the plane direction, the liquid crystal layer 16 can be made to be in the first form in which the unevenness on the uneven surface, that is, the film thickness distribution is reduced, preferably, is flattened.

Figure 2:
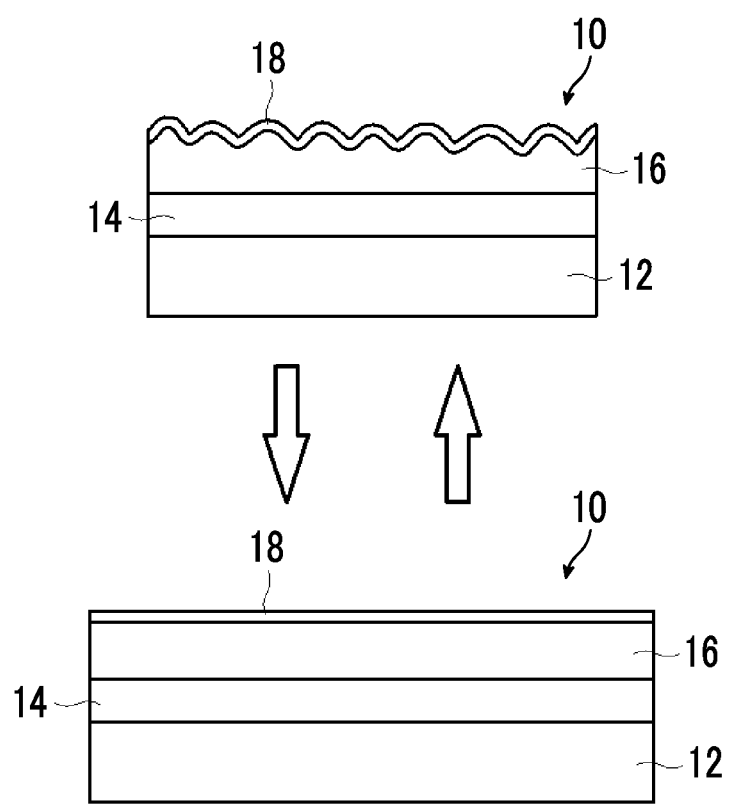
FIG. 2 is a conceptual diagram showing an action of the optical element according to the present invention.

That is, the optical element 10 according to the embodiment of the present invention is reversibly switchable between the reference form where the liquid crystal layer 16 has unevenness and the first form where the liquid crystal layer 16 is flattened such that the film thickness distribution of the liquid crystal layer 16 is less than that of the reference form (refer to FIG. 2). In the optical element 10 in the example shown in the drawing, the surface on the alignment film 14 side, that is, the surface on the support 12 side is typically a flat surface along the alignment film.

By including the liquid crystal layer 16, the optical element 10 according to the embodiment of the present invention can be suitably used for various applications.

As the liquid crystal layer 16, various well-known liquid crystal layers can be used as long as the liquid crystal compound is aligned and is not cured and the liquid crystal layer has the uneven surface, that is, the film thickness distribution in the reference form.

Preferable examples of the liquid crystal layer 16 include a cholesteric liquid crystal layer where a liquid crystal compound is cholesterically aligned. That is, it is preferable that the liquid crystal layer 16 is a liquid crystal layer formed of a liquid crystal compound having a cholesteric structure.

It is known that the cholesteric liquid crystalline phase exhibits selective reflectivity at a specific wavelength. The center wavelength of selective reflection (selective reflection center wavelength) $\lambda c$ depends on a pitch P of a helical structure in the cholesteric liquid crystalline phase and satisfies a relationship of $\lambda c = n \times P$ with an average refractive index n of the cholesteric liquid crystalline phase.

Therefore, the selective reflection center wavelength can be adjusted by adjusting the pitch of the helical structure. The pitch of the cholesteric liquid crystalline phase depends on the kind of a chiral agent which is used in combination of a liquid crystal compound during the formation of the cholesteric liquid crystal layer, or the concentration of the chiral agent added. Therefore, a desired pitch can be obtained by adjusting the kind and concentration of the chiral agent.

The details of the adjustment of the pitch P can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

One pitch of the helical structure of the cholesteric liquid crystalline phase has a configuration in which the liquid crystal compound is helically rotated once (360° rotation) and laminated. In addition, the helical pitch P (helical pitch) in the cholesteric liquid crystalline phase refers to the length in the thickness direction of one pitch of the helical structure in which the liquid crystal compound is helically rotated once and laminated. In the cholesteric liquid crystalline phase, the thickness direction typically matches with the helical axis direction.

In a case where a cross-section of the cholesteric liquid crystal layer is observed with a scanning electron microscope (SEM), a stripe pattern in which bright lines (bright portions) and dark lines (dark portions) derived from a cholesteric liquid crystalline phase are alternately laminated in the thickness direction is observed.

The helical pitch P of the cholesteric liquid crystal layer is twice the distance between bright lines. In other words, the helical pitch P of the cholesteric liquid crystal layer is equal to the length corresponding to three bright lines and two dark lines in the thickness direction, that is, the length corresponding to three dark lines and two bright lines in the thickness direction. This length refers to the inter-center distance of bright lines or dark lines vertically adjacent to each other in the thickness direction.

The cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected. Accordingly, the helical twisted direction in the cholesteric liquid crystalline phase can be verified by causing right circularly polarized light and/or left circularly polarized light to be incident into the cholesteric liquid crystal layer.

A turning direction of the cholesteric liquid crystalline phase can be adjusted by adjusting the kind of the liquid crystal compound for forming the cholesteric liquid crystal layer and/or the kind of the chiral agent to be added.

In addition, in the cholesteric liquid crystalline phase, a half-width $\Delta\lambda$ (nm) of a selective reflection wavelength range (circularly polarized light reflection wavelength range) where selective reflection is exhibited depends on $\Delta n$ of the cholesteric liquid crystalline phase and the helical pitch P and satisfies a relationship of $\Delta\lambda = \Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment.

The selective reflection center wavelength and the selective reflection wavelength range in the cholesteric liquid crystal layer for forming the liquid crystal layer 16 are not particularly limited, and may be appropriately set depending on the use of the optical element 10.

For example, in a case where the optical element according to the embodiment of the present invention is used as an optical element for switching between viewing angles of a liquid crystal display described below, it is preferable that the selective reflection center wavelength of the cholesteric liquid crystal layer for forming the liquid crystal layer 16 is in an infrared wavelength range. This point will be described below.

In addition, in a case where the optical element according to the embodiment of the present invention is used as an ambient display described below, it is preferable that the cholesteric liquid crystal layer has, as the selective reflection center wavelength, a wavelength corresponding to, for example, a color of a wall to which the ambient display is attached.

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized.

The structure in which a cholesteric liquid crystalline phase is immobilized is not particularly limited as long as the optical characteristics of the cholesteric liquid crystalline phase are maintained, and the liquid crystal compound in the cholesteric liquid crystal layer does not necessarily exhibit liquid crystallinity.

Examples of a material used for forming the cholesteric liquid crystal layer where the liquid crystal compound is cholesterically aligned include a liquid crystal composition including a liquid crystal compound.

In addition, the liquid crystal composition used for forming the cholesteric liquid crystal layer may further include a surfactant and a chiral agent.

<<Liquid Crystal Compound (Rod-Like Liquid Crystal Compound)>>

The liquid crystal compound may be a rod-like liquid crystal compound or a disk-like liquid crystal compound.

Examples of the rod-like liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

Examples of the liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more liquid crystal compounds may be used in combination. In a case where two or more liquid crystal compounds are used in combination, the alignment temperature can be decreased.

In addition, as a liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

<<Disk-Like Liquid Crystal Compound>>

As the disk-like liquid crystal compound, for example, compounds described in JP2007-108732A and JP2010-244038A can be preferably used.

In addition, the addition amount of the liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

<<Molecular Weight of Liquid Crystal Compound>>

The molecular weight of the liquid crystal compound in the liquid crystal composition is not particularly limited.

Here, in the optical element 10 according to the embodiment of the present invention, the polymer layer 18 described below is formed using an application method after applying the liquid crystal composition for forming the liquid crystal layer 16, aligning the liquid crystal compound, and optionally drying the liquid crystal composition.

Accordingly, in a manufacturing step of the optical element 10 according to the embodiment of the present invention, in a case where the coating liquid for forming the polymer layer 18 is applied, it is preferable that the liquid crystal composition for forming the liquid crystal layer 16 and the coating liquid for forming the polymer layer 18 are suppressed from being mixed.

In consideration of this point, it is preferable that the liquid crystal compound in the liquid crystal composition has a molecular weight to some extent. The molecular weight of the liquid crystal compound in the liquid crystal composition for forming the liquid crystal layer 16 is preferably 800 to 3000 and more preferably 900 to 1500.

<<Surfactant>>

The liquid crystal composition for forming the cholesteric liquid crystal layer may include a surfactant.

It is preferable that the surfactant is a compound that can function as an alignment control agent contributing to the stable or rapid formation of a cholesteric liquid crystalline phase with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

<<Chiral Agent (Optically Active Compound)>>

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof.

In addition, the chiral agent may be a liquid crystal compound.

In a case where the chiral agent includes a photoisomerization group, a pattern having a desired reflection wavelength corresponding to a luminescence wavelength can be formed by emission of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-0179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

The content of the chiral agent in the liquid crystal composition refers to the content of the chiral agent with respect to the total solid content of the composition.

<<Other Additives>>

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

In a case where the cholesteric liquid crystal layer for forming the liquid crystal layer 16 is formed, it is preferable that the cholesteric liquid crystal layer is formed by applying the liquid crystal composition to a surface where the cholesteric liquid crystal layer is to be formed, and aligning the liquid crystal compound to a state of a cholesteric liquid crystalline phase.

For example, in a case where the cholesteric liquid crystal layer for forming the liquid crystal layer 16 is formed on the alignment film 14, it is preferable that a cholesteric liquid crystal layer obtained by applying the liquid crystal composition for forming the alignment film 14 and aligning the liquid crystal compound in a cholesteric liquid crystalline phase state is formed as the liquid crystal layer 16. In the optical element 10 according to the embodiment of the present invention, the liquid crystal compound is not cured (not crosslinked).

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

In the optical element 10 according to the embodiment of the present invention, in a case where the cholesteric liquid crystal layer is formed as the liquid crystal layer 16, a plurality of cholesteric liquid crystal layers may be provided.

In this case, the selective reflection center wavelengths of the plurality of cholesteric liquid crystal layers may be the same as or different from each other. In this case, helical senses of the plurality of cholesteric liquid crystal layers, that is, turning directions of circularly polarized light to be selectively reflected may be the same as or different from each other.

For example, in a case where the optical element 10 according to the embodiment of the present invention is used as an ambient display described below and the ambient display is attached to a white wall, the liquid crystal layer 16 may include three cholesteric liquid crystal layers including a cholesteric liquid crystal layer having a selective reflection center wavelength in a blue light wavelength range, a cholesteric liquid crystal layer having a selective reflection wavelength range in a green light wavelength range, and a cholesteric liquid crystal layer having a selective reflection center wavelength in a red light wavelength range.

In the optical element 10 according to the embodiment of the present invention, the liquid crystal layer 16 is not limited to the cholesteric liquid crystal layer. That is, in the optical element 10 according to the embodiment of the present invention, various well-known liquid crystal layers can be used as the liquid crystal layer.

For example, in the liquid crystal layer 16, the liquid crystal compound may be homogeneously aligned instead of the cholesteric liquid crystal layer in which the liquid crystal compound is cholesterically aligned.

In addition, the liquid crystal layer 16 may be a positive C-plate in which a major axis of the rod-like liquid crystal compound is aligned (vertically aligned) in a thickness direction, a negative C-plate in which a disc plane of disk liquid crystal is aligned parallel to (horizontally aligned) a substrate surface, or may be an A-Plate formed of a rod-like liquid crystal compound. In particular, it is preferable that the liquid crystal layer 16 is a C-plate. It can also be said that the above-described cholesteric liquid crystal layer is a C-plate.

This liquid crystal layer 16 may be formed using the same method as the method of forming the above-described cholesteric liquid crystal layer, except that a liquid crystal composition not including a chiral agent is prepared.

In either case, in the liquid crystal layer 16, the liquid crystal compound is not cured (not crosslinked). That is, during the formation of the liquid crystal layer 16, a curing step of the liquid crystal compound is not performed.

In the optical element 10 according to the embodiment of the present invention, the thickness of the liquid crystal layer 16 is not particularly limited, and may be appropriately set depending on the use of the optical element 10, the material for forming the liquid crystal layer 16, and the like such that the optical element 10 can exhibit required optical characteristics.

In the optical element 10 according to the embodiment of the present invention, the polymer layer 18 is formed on the liquid crystal layer 16.

The polymer layer 18 is a layer formed of a polymer (a polymer compound, a resin) and has an unevenness shape following the uneven surface of the liquid crystal layer 16.

In the present invention, the polymer layer 18 forms the liquid crystal layer 16 having the film thickness distribution where one surface has unevenness by stretching and contraction in the plane direction during the manufacturing of the optical element 10 described below, and supports the reversible switch between the reference form and the first form by the stretching and contraction of the liquid crystal layer 16. That is, basically, in a case where the optical element 10 is formed, the polymer layer 18 does not exhibit an optical action or the like.

Accordingly, a material for forming the polymer layer 18 is not particularly limited, and various well-known layers formed of polymers can be used as long as they have optical characteristics such as transparency depending on the use of the optical element 10.

Here, the polymer layer 18 described below is formed without crosslinking (curing) the liquid crystal compound after applying the liquid crystal composition for forming the liquid crystal layer 16 during the formation of the liquid crystal layer 16, aligning the liquid crystal compound, and optionally drying the liquid crystal composition.

In addition, the polymer layer 18 is formed using an application method of applying a coating liquid including a material for forming the polymer layer 18 drying the applied coating liquid, and optionally crosslinking (curing) the coating liquid.

Therefore, the coating liquid for forming the polymer layer 18 needs to be prevented from being mixed with the liquid crystal composition for forming the liquid crystal layer 16 during the application.

The liquid crystal compound is generally hydrophobic. Accordingly, as the polymer for forming the polymer layer 18, a hydrophilic polymer is suitably used.

Examples of the hydrophilic polymer for forming the polymer layer 18 include polyvinyl alcohol (PVA), polyacrylamide, polyacrylic acid, an ethylene-vinyl acetate copolymer (EVA), polyvinylpyrrolidone (PVP), cellulose, ethyl cellulose, methyl cellulose, acetyl cellulose, starch, pullulan, chitin, chitosan, polyethylene glycol, a polymer having a sulfobetaine structure, a polymer having a glycerin structure, a polymer having a boronic acid structure, polystyrene sulfonic acid, a phenolic resin, an epoxy resin, and poly(2-oxazoline).

Among these, PVA or polyacrylic acid is suitably used.

The thickness of the polymer layer 18 is not particularly limited.

As described above, in the optical element 10, the polymer layer 18 does not exhibit an optical action or the like, and forms the liquid crystal layer 16 having the film thickness distribution where one surface has unevenness by stretching and contraction in the plane direction during the manufacturing of the optical element 10. Accordingly, the thickness of the polymer layer 18 may be appropriately set depending on the forming material such that the action of forming the unevenness by stretching and contraction is exhibited.

The thickness of the polymer layer 18 is preferably 0.01 to 10 μm, preferably 0.1 to 1 μm, and still more preferably 0.1 to 0.5 μm.

A method of forming the polymer layer is not limited. Any one of various well-known methods corresponding to a material for forming the polymer layer 18 can be used.

Examples of the method include a method of forming the polymer layer 18 using the application method by preparing a coating liquid including a material for forming the polymer layer 18, applying the coating liquid to the non-cured liquid crystal layer 16, and heating and drying the coating liquid. For example, in a case where the polymer layer 18 is formed of PVA, the polymer layer 18 may be formed by preparing a coating liquid in which PVA is dissolved in pure water, applying the coating liquid to the non-cured liquid crystal layer, and heating and drying the coating liquid.

In the optical element 10 according to the embodiment of the present invention, the liquid crystal compound is aligned, the liquid crystal compound of the liquid crystal layer 16 is not cured (not crosslinked), and the optical element 10 is reversibly switchable between the reference form and the first form where the film thickness distribution of the liquid crystal layer 16 is less than that of the reference form. As a result, the optical element 10 can be used for various applications.

For example, the optical element 10 (liquid crystal layer 16) according to the embodiment of the present invention can be used as an A-plate, a C-plate, or the like depending on the kind and the alignment state of the liquid crystal compound for forming the liquid crystal layer 16.

Examples of the A-Plate include two kinds including a positive A-plate and a negative A-Plate. In a case where a refractive index in an in-plane slow axis direction of the film (direction in which a refractive index in a plane is maximum) is represented by nx, a refractive index in a direction perpendicular to the in-plane slow axis in a plane is represented by ny, a refractive index in a thickness direction is represented by nz, the positive A-plate satisfies a relationship represented by Expression (A1), and the negative A-plate satisfies a relationship represented by Expression (A2). Rth of the positive A-plate has a positive value, and Rth of the negative A-Plate has a negative value.

$$nx > ny \approx nz \quad \text{Expression (A1)}$$

$$nx \approx ny < nz \quad \text{Expression (A2)}$$

"≈" described above represents not only a case where both elements are the same but also a case where both elements are substantially the same. Regarding the meaning of "substantially the same", "ny≈nz" includes a case where (ny−nz)×d is −10 to 10 nm and preferably −5 to 5 nm, and "nx≈nz" includes a case where (nx−nz)×d is −10 to 10 nm and preferably −5 to 5 nm. In the above-described expression, d represents the thickness of the film.

Examples of the C-Plate include two kinds including a positive C-plate and a negative C-Plate. The positive C-plate satisfies a relationship represented by Expression (C1), and the negative C-plate satisfies a relationship represented by Expression (C2). Rth of the positive C-plate has a negative value, and Rth of the negative C-Plate has a positive value.

$$nz > nx \approx ny \quad \text{Expression (C1)}$$

$$nz < nx \approx ny \quad \text{Expression (C2)}$$

"≈" described above represents not only a case where both elements are the same but also a case where both elements are substantially the same. Regarding the meaning of "substantially the same", "nx≈ny" includes a case where (nx−ny)×d is 0 to 10 nm and preferably 0 nm to 5 nm. In the above-described expression, d represents the thickness of the film.

Rth represents the thickness-direction retardation.

As described above, the optical element 10 according to the embodiment of the present invention is reversibly switchable between the reference form and the first form where the film thickness distribution of the liquid crystal layer 16 is less than that of the reference form. The film thickness distribution (in-plane film thickness distribution) is "in-plane maximum film thickness/in-plane minimum film thickness". A method of measuring the film thickness distribution is as follows.

In the present invention, the liquid crystal compound in the liquid crystal layer 16 is not cured. In addition, in the reference form, the surface of the liquid crystal layer 16 on the polymer layer 18 side is the uneven surface, and the polymer layer 18 has an unevenness shape following the uneven surface.

As a result, in the optical element 10, by stretching the liquid crystal layer 16 and the polymer layer 18 in the reference form where the liquid crystal layer 16 conceptually shown in the upper stage of FIG. 2 has the uneven surface, the uneven surface of the liquid crystal layer 16 and the polymer layer 18 are flattened as conceptually shown in the lower stage of FIG. 2. As a result, the optical element 10 can be switched to the first form where the film thickness distribution of the liquid crystal layer 16 is less than that of the reference form. In addition, by contracting the liquid crystal layer 16 and the polymer layer 18 in the first form to restore the original state, the optical element 10 can be restored to the reference form.

In the optical element 10 according to the embodiment of the present invention, a method of stretching/contracting the liquid crystal layer 16 and the polymer layer 18 is not particularly limited.

In an exemplary method, the optical element 10 is switched to the first form by heating the optical element 10 in the reference form to expand and stretch the liquid crystal layer 16 and the polymer layer 18, and the optical element 10 is switched to the reference form by returning the optical element 10 to normal temperature in the first form to restore the stretched liquid crystal layer 16 and the stretched polymer layer 18 to the original state.

In this case, the heating temperature is not particularly limited, and may be appropriately determined depending on the materials for forming the liquid crystal layer 16 and the polymer layer 18 and the like such that the liquid crystal layer 16 and the polymer layer 18 can be stretched by a required amount.

In another method, the optical element 10 can be switched from the reference form to the first form by holding an end part of the optical element 10 or end parts of the liquid crystal layer 16 and the polymer layer 18 and stretching the liquid crystal layer 16 and the polymer layer 18 in a range of elastic deformation until the unevenness of the liquid crystal layer 16 is stretched, and the optical element 10 can be switched from the first form to the reference form by releasing the stretching.

The polymer layer 18 has unevenness. Therefore, the polymer layer 18 exhibits the restoring power during stretching, and contracts to return to the reference form when the stretching in the first form in the stretched state is released. In this case, it is preferable that the stretching is performed uniformly in the plane direction. For example, in a case where the optical element 10 has a rectangular shape, it is preferable that four corners of the optical element 10 are held and are stretched in a biaxial direction, or it is preferable that four sides of the optical element 10 are held and are stretched in a biaxial direction.

The stretching method is not particularly limited, and well-known methods such as a method using a cylinder or methods to which principles of various methods described in Film Forming Process of Journal of Textile Engineering, Vol. 55 (2002), No. 12 are applied can be used.

In addition, the holding method is also not limited, and various well-known methods, for example, a method using a holding unit or a sandwiching unit such as a clamp or a nip roll or a method of fixing only the end parts using an adhesive, a pressure sensitive adhesive can be used.

In the example shown in FIG. 2, in a preferable aspect, the liquid crystal layer 16 and the polymer layer 18 are stretched in the first form until the liquid crystal layer 16 and the polymer layer 18 are flattened.

However, in the optical element 10 according to the embodiment of the present invention, the first form is not limited to this example. For example, in a case where the film thickness distribution is less than that of the reference form, the unevenness of the uneven surface of the liquid crystal layer 16 in the first form may remain. In addition, the optical element 10 according to the embodiment of the present invention may adopt plural types of first forms having different film thickness distributions.

That is, in a case where the film thickness distribution is less than that of the reference form, the optical element 10 according to the embodiment of the present invention may adopt various states as the first form.

In addition, in FIG. 2, the entire region of the liquid crystal layer 16 in the thickness direction stretches/contracts. However, the stretching and contraction of the optical element 10 according to the embodiment of the present invention is not limited to this example. For example, in the optical element 10, by mechanically stretching and contracting the polymer layer 18, only the region of the liquid crystal layer 16 on the polymer layer 18 side may stretch and contract such that the optical element 10 switches between the reference form and the first form.

By stretching/contracting the entire optical element 10 in the plane direction, the optical element 10 may switch between the reference form and the first form. In this case, optionally, the support 12 may be formed of a material having stretchability (elasticity).

That is, as long as the optical element 10 according to the embodiment of the present invention is switchable between the reference form and the first form where the film thickness distribution is less than that of the reference form, the stretching (deformation) state of the liquid crystal layer 16 is not particularly limited.

As described above, in the liquid crystal layer 16 of the optical element 10 according to the embodiment of the present invention, in the reference form, the surface on the alignment film 14 (support 12) side is flat, and the opposite surface on the polymer layer 18 side is the uneven surface where irregular unevenness is two-dimensionally provided. As a result, the liquid crystal layer 16 has the film thickness distribution.

That is, in the reference form, the film thickness of the liquid crystal layer 16 in the plane direction varies. Accordingly, in a case where the liquid crystal layer 16 is the C-plate, the liquid crystal layer 16 has portions having different values of Rth as the thickness-direction retardation in the plane direction.

On the other hand, in the first form, the film thickness of the liquid crystal layer 16 in the plane direction is uniform. Accordingly, in a case where the liquid crystal layer 16 is the C-plate, Rth as the thickness-direction retardation of the liquid crystal layer 16 is uniform in the plane direction.

As also described in JP4928608B, the C-plate is used as an optical element that switches between a typical viewing angle and a narrow viewing angle, that is, a viewing angle control element in a liquid crystal display.

Figure 3:
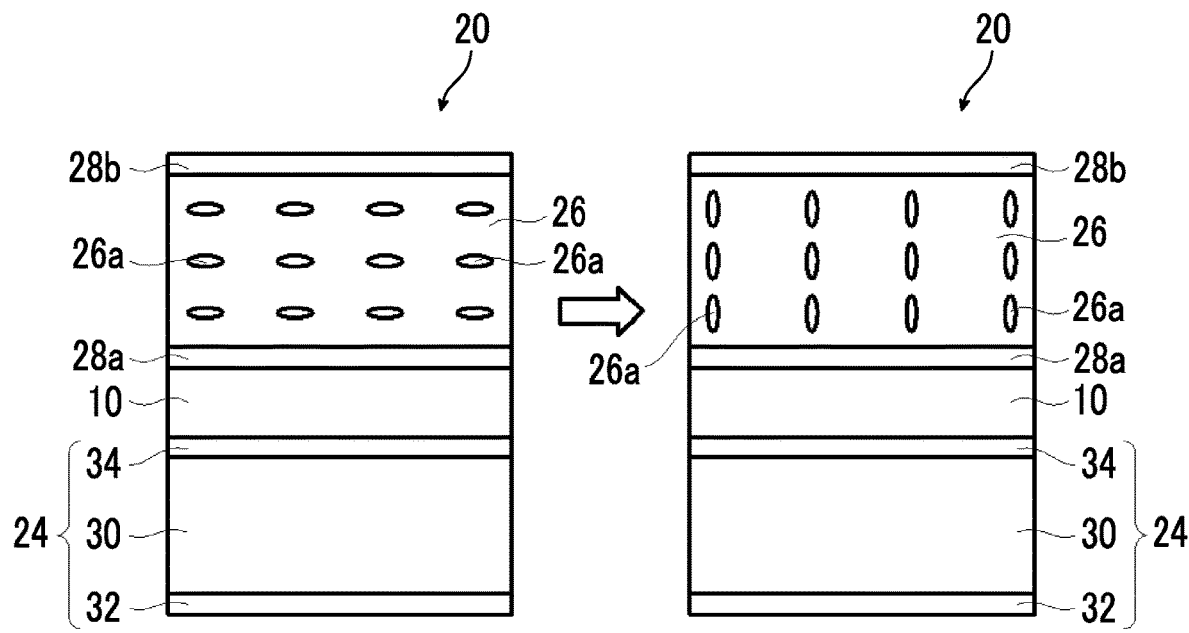
FIG. 3 is a conceptual diagram showing an action of a liquid crystal display including the optical element according to the present invention.

FIG. 3 conceptually shows an example where the optical element 10 according to the embodiment of the present invention is used as a viewing angle switching element.

A liquid crystal display 20 shown in FIG. 3 includes a liquid crystal panel 24 for image display, the optical element 10 according to the embodiment of the present invention, a first polarizer 28a for switching between viewing angles, a liquid crystal cell 26 for switching between viewing angles, and a second polarizer 28b for switching between viewing angles. In the example shown in the drawing, the viewing angle switching element includes the optical element 10 according to the embodiment of the present invention, the first polarizer 28a for switching between viewing angles, the liquid crystal cell 26 for switching between viewing angles, and the second polarizer 28b for switching between viewing angles.

The liquid crystal panel 24 is a well-known liquid crystal cell including a liquid crystal cell 30 for display, an incidence side polarizer 32, and an emission side polarizer 34. A well-known backlight unit (not shown) is disposed below the liquid crystal panel 24 in the drawing.

In FIG. 3, a transparent electrode or the like for driving the liquid crystal cell 26 for switching and the liquid crystal cell 30 for display is not shown.

In the liquid crystal panel 24, directions of transmission axes (absorption axes) of the incidence side polarizer 32 and the emission side polarizer 34 may be perpendicular to each other (crossed nicols) or may be the same as each other depending on the kind of the liquid crystal cell 30 for display.

On the other hand, the emission side polarizer 34, the first polarizer 28a for switching between viewing angles, the second polarizer 28b for switching between viewing angles are arranged in a so-called parallel nicols state where directions of transmission axes match with each other.

In addition, the optical element 10 according to the embodiment of the present invention is the C-plate. In the optical element 10, the liquid crystal layer 16 (including the cholesteric liquid crystal layer) substantially acts as the C-plate.

As conceptually shown on the left side in FIG. 3, in the liquid crystal display 20, in a case where image display at a typical viewing angle is performed, a major axis direction (slow axis direction) of a liquid crystal compound 26a of the liquid crystal cell 26 for switching matches with a transmission axis of the emission side polarizer 34, that is, the first polarizer 28a and the second polarizer 28b for switching between viewing angles.

Accordingly, in this state, the liquid crystal cell 26 for switching does not exhibit any optical action. That is, in this state, the liquid crystal display 20 can observe an image at a typical viewing angle depending on the characteristics of the liquid crystal panel 24.

On the other hand, in a case where the viewing angle is narrow, the liquid crystal cell 26 for switching is driven such that a major axis direction of the liquid crystal compound 26a of the liquid crystal cell 26 for switching matches the thickness direction as conceptually shown on the right side of FIG. 3. That is, the liquid crystal compound 26a is vertically aligned.

In this state, in a case where the liquid crystal display 20 is observed from the front direction, the liquid crystal compound is vertically aligned. Accordingly, an image can be typically observed without being affected by a phase difference by the liquid crystal compound 26a.

On the other hand, in a case where the liquid crystal display 20 is observed from an oblique direction in this state, light is affected by the phase difference by the liquid crystal compound 26a that is vertically aligned. Light traveling in an oblique direction is refracted by a total phase difference of the phase difference by the liquid crystal cell 26 for switching and a phase difference of the optical element 10 (liquid crystal layer 16) as the C-plate. As a result, the light is shielded.

Therefore, in a state where the liquid crystal compound 26a of the liquid crystal cell 26 for switching is vertically aligned, an image cannot be observed from an oblique direction, and the viewing angle can be narrowed.

Basically, this effect is the same as in the device described in JP4928608B.

Here, in the optical element 10 according to the embodiment of the present invention, in the reference form, the liquid crystal layer 16 that substantially acts as the C-plate has the uneven surface, that is, has the film thickness distribution on one surface.

Accordingly, in the liquid crystal display 20 including the optical element 10 according to the embodiment of the present invention, in a state where the liquid crystal compound 26a of the liquid crystal cell 26 for switching is vertically aligned such that the viewing angle is narrow, the total phase difference of the phase difference by the liquid crystal cell 26 for switching and the phase difference of the optical element 10 (liquid crystal layer 16) changes in an in-plane direction. That is, in the liquid crystal display 20, in a narrow viewing angle state, the thickness-direction retardation Rth varies in the plane direction.

Figure 4:
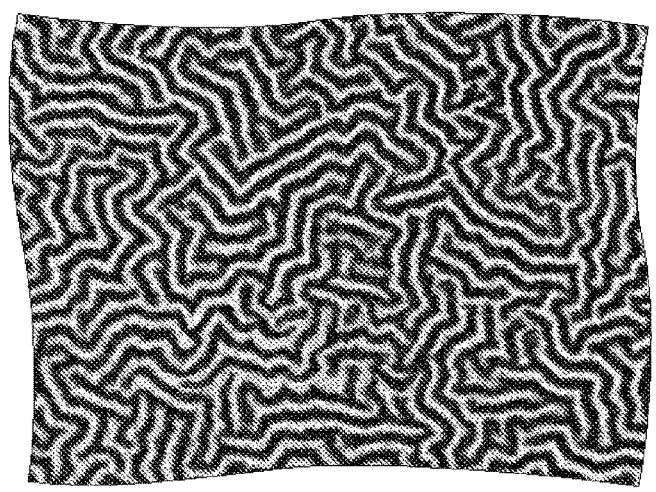
FIG. 4 is a diagram conceptually showing a design in a case where the liquid crystal display shown in FIG. 2 is observed from an oblique direction.

As a result, in the liquid crystal display 20 including the optical element 10 according to the embodiment of the present invention as the viewing angle switching element, in a case where an image is observed from an oblique direction in a narrow viewing angle state, the light shielding state changes in the plane direction, and a fine pattern is observed. Specifically, in the liquid crystal display 20 including the optical element 10 according to the embodiment of the present invention as the viewing angle switching element, in a case where an image is observed from an oblique direction in a narrow viewing angle state, a fine pattern where bright lines and dark lines are formed alternately and complexly in an x direction and a y direction perpendicular to each other as conceptually shown in FIG. 4 is observed.

In a liquid crystal display including a viewing angle switching element in the related art that includes a liquid crystal cell, a polarizer, and a typical C-plate, in a case where an image is observed from an oblique direction in a narrow viewing angle state, the light shielding state is uniform in the plane direction. Therefore, in a case where an image is observed from an oblique direction in a narrow viewing angle state, the image may also be visually recognized depending on the degree of light shielding, the display brightness, the observation method, the design, and the like.

On the other hand, in the liquid crystal display 20 including the optical element 10 according to the embodiment of the present invention as the viewing angle switching element, in a case where an image is observed from an oblique direction in a narrow viewing angle state, light is shielded, and a fine pattern is also observed. As a result, as compared to a case where light is uniformly shielded, the image is more suitably suppressed from being visually recognized.

In particular, in a case where the liquid crystal layer 16 is the above-described cholesteric liquid crystal layer and has a selective reflection center wavelength in an infrared range, the visibility of an image observed from an oblique direction in a narrow viewing angle state can be more suitably reduced.

As described above, the cholesteric liquid crystal layer can selectively reflect light in a specific wavelength range. Accordingly, by setting the selective reflection center wavelength to be in an infrared range, the observation of an image from the front is not hindered in a narrow viewing angle state.

On the other hand, as is well known, in a case where light is incident into the cholesteric liquid crystal layer from an oblique direction, so-called blue shift (short wavelength shift) in which the selective reflection wavelength range is shifted to a shorter wavelength side occurs. Therefore, in a case where the liquid crystal display 20 is observed from an oblique direction in a narrow viewing angle state, a fine pattern is visually recognized, and this pattern has redness.

Further, as shown below in Examples, in the optical element 10 according to the embodiment of the present invention that is manufactured using a method described below, in a case where the liquid crystal layer 16 is the cholesteric liquid crystal layer, the helical pitch P varies depending on the film thickness. Specifically, as the film thickness increases, the helical pitch increases. That is, the helical pitch of convex portions is longer than that of concave portions.

As described above, the selective reflection wavelength range of the cholesteric liquid crystal layer varies depending on the helical pitch, and as the helical pitch increases, the wavelength of light to be selectively reflected increases. Accordingly, by using the liquid crystal layer 16 as the cholesteric liquid crystal layer, in a case where an image is observed from an oblique direction in a narrow viewing angle state, the tint varies between convex portions and concave portions.

That is, by using the liquid crystal layer 16 as the cholesteric liquid crystal layer in the optical element 10 according to the embodiment of the present, in a liquid crystal display that switches between viewing angles using the optical element 10 according to the embodiment of the present invention, in a case where an image is observed from an oblique direction in a narrow viewing angle state, a fine pattern is observed, and the tint of the fine pattern also changes.

As a result, by using the liquid crystal layer 16 as the cholesteric liquid crystal layer in the optical element 10 according to the embodiment of the present, the visibility of an image observed from an oblique direction in a narrow viewing angle state can be more suitably reduced.

In the optical element 10 according to the embodiment of the present invention, in a case where the liquid crystal layer 16 is the cholesteric liquid crystal layer, a variation in helical pitch between the concave portions and the convex portions in the reference form is not particularly limited.

In an image obtained by observing a cross section of the liquid crystal layer 16 (cholesteric liquid crystal layer) with a SEM, in convex portions and concave portions adjacent to each other, a ratio of a helical pitch of convex portions to a helical pitch of concave portions satisfies preferably "1.05<(convex portions/concave portions)<100", more preferably "1.1<(convex portions/concave portions)<10", and still more preferably "1.5<(convex portions/concave portions)<3".

It is preferable that the ratio between the helical pitches of the concave portions and the convex portions is 1.05 or more, for example, from the viewpoint that the visibility of an image observed from an oblique direction in a narrow viewing angle state of a liquid crystal display can be more suitably reduced and the viewpoint that the decorativeness is excellent due to contrast of reflected colors by the cholesteric liquid crystal layer structure.

It is preferable that the ratio between the helical pitches of the concave portions and the convex portions is 100 or less, for example, from the viewpoint that the whitening of the optical element 10 by distortion can be suppressed.

As described above, in an image obtained by observing a cross section of the liquid crystal layer 16 (cholesteric liquid crystal layer) with a SEM, the helical pitch P of the cholesteric liquid crystal layer is twice the distance between bright lines.

In addition, in the present invention, the ratio between the helical pitches of the convex portions and the concave portions may be obtained by measuring the ratios between helical pitches of 10 uneven portions adjacent to each other and obtaining the average value thereof as a difference between the helical pitches of the uneven portions in the liquid crystal layer 16 of the optical element 10.

In the following description, it is assumed that the liquid crystal layer 16 is in the reference form.

Here, the optical element 10 according to the embodiment of the present invention is switched from the reference form to the first form. The first form is the state where the film thickness distribution of the liquid crystal layer 16 is less than that of the reference form and is, for example, a state where the unevenness of the liquid crystal layer 16 is removed such that the liquid crystal layer 16 is flat.

In this state, the film thickness of the liquid crystal layer 16 is uniform, and the thickness-direction retardation Rth is uniform in the plane direction.

Therefore, by switching the optical element 10 from the reference form to the first form in a narrow viewing angle state, a pattern is removed as in the viewing angle switching element including the typical C-plate, and even in a case where an image is observed from an oblique direction in a narrow viewing angle state, the visibility can be slightly improved.

In addition, in the first form, the liquid crystal layer 16 is stretched. Therefore, even in a case where the liquid crystal layer 16 is a cholesteric liquid crystal layer having a selective reflection center wavelength in an infrared wavelength range, in a case where an image is observed from an oblique direction, the image does not also have redness in the first form.

That is, in the optical element 10 according to the embodiment of the present invention, in a case where an image is observed from an oblique direction in a narrow viewing angle state, the redness switches between addition and non-addition.

Specifically, in the first form (stretched state), the helical pitch of the cholesteric liquid crystal layer is set to be in a longer wavelength range where infrared light is reflected not only in a case where an image is observed from the front but also in a case where an image is observed from an oblique direction where blue shift (short wavelength shift) occurs. In this configuration, the helical pitch of the concave portions further decreases in the reference form (contracted state). Therefore, the reflection wavelength is shifted to a shorter wavelength side, and the reflection wavelength range enters in a visible range (red light range). As a result, in the reference form, a part of the image can be made to have redness. Accordingly, with this configuration, the optical element 10 can switch between the colorless state in the first form and the redness state in the reference form.

That is, by using the optical element 10 according to the embodiment of the present invention as a viewing angle switching element of a liquid crystal display, in a case where an image is observed from an oblique direction in a narrow viewing angle state, the visibility of the image can switch between two stages.

In addition, according to the present invention, by adjusting the stretched state of the liquid crystal layer 16, in a case where an image is observed from an oblique direction in a narrow viewing angle state, the visibility of the image can switch between two or more stages.

In a case where the liquid crystal layer 16 is formed as a cholesteric liquid crystal layer having a selective reflection center wavelength in an infrared wavelength range, in a case where an image is observed from an oblique direction in a state where image display at a typical wide viewing angle is performed, the image may have redness due to the blue shift of the cholesteric liquid crystal layer.

Here, as described above, in the optical element 10 according to the embodiment of the present invention, even in a case where an image is observed from an oblique direction, the image can be prevented from having redness in the first form.

From this viewpoint, in a case where the liquid crystal layer 16 is formed as a cholesteric liquid crystal layer having a selective reflection center wavelength in an infrared wavelength range, it is preferable that the liquid crystal layer 16 is in the first form in a state where image display at a typical wide viewing angle is performed.

That is, by using the optical element according to the embodiment of the present invention as a viewing angle switching element of a liquid crystal display, in a case where the liquid crystal layer 16 is formed as the cholesteric liquid crystal layer and an image displayed at a wide viewing angle is observed from an oblique direction, a change in the tint of the image can also be prevented.

In addition, by forming the liquid crystal layer 16 using cholesteric liquid crystal, the optical element 10 according to the embodiment of the present invention can also be used as an ambient display.

Figure 5:
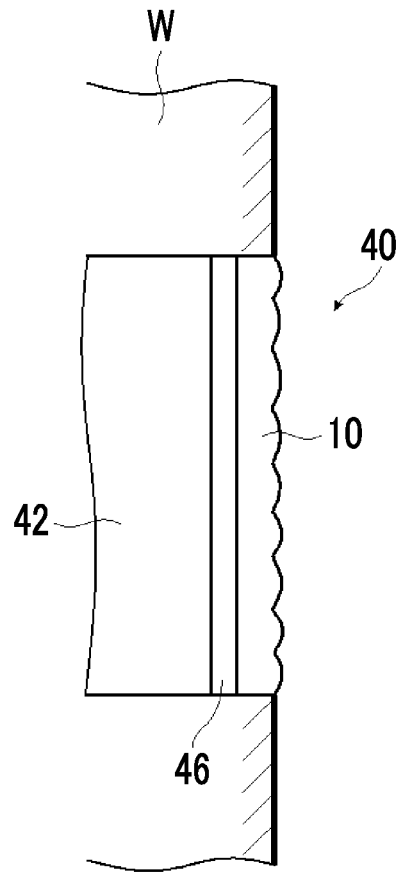
FIG. 5 is a diagram conceptually showing an example of an ambient display including the optical element according to the present invention.

FIG. 5 conceptually shows an example of the ambient display.

An ambient display 40 shown in FIG. 5 includes a liquid crystal display 42, a λ/4 plate 46, and the optical element 10 according to the embodiment of the present invention. In the example shown in the drawing, the ambient display 40 is incorporated into an indoor wall W.

The liquid crystal display 42 is a well-known liquid crystal display.

In addition, the λ/4 plate 46 is a well-known λ/4 plate. The λ/4 plate 46 converts linearly polarized light emitted from the liquid crystal display into circularly polarized light in a turning direction (sense) opposite to that of circularly polarized light that is reflected from the cholesteric liquid crystal layer forming the liquid crystal layer 16 of the optical element.

The optical element 10 acts as a decorative film and includes the liquid crystal layer 16 consisting of the cholesteric liquid crystal layer. As described above, in the optical element 10 used in the ambient display 40, the selective reflection center wavelength of the cholesteric liquid crystal layer forming the liquid crystal layer 16 is a wavelength corresponding to the color of the wall W. For example, in a case where the color of the wall W is green, the selective reflection center wavelength of the cholesteric liquid crystal layer forming the liquid crystal layer 16 may be in a wavelength range of green. In addition, in a case where the color of the wall W is white, the liquid crystal layer 16 may be configured to include three cholesteric liquid crystal layers including a cholesteric liquid crystal layer having a selective reflection center wavelength in a blue light wavelength range, a cholesteric liquid crystal layer having a selective reflection wavelength range in a green light wavelength range, and a cholesteric liquid crystal layer having a selective reflection center wavelength in a red light wavelength range.

The ambient display is a display that includes a decorative film and is incorporated into, for example, an indoor wall. For example, in a case where the ambient display does not display an image, the appearance is integrated with the wall, and in a case where the ambient display displays an image, the image is displayed on a plane of the wall.

For example, by using the liquid crystal display, the λ/4 plate, the cholesteric liquid crystal layer as the decorative film, the ambient display can be configured.

That is, as described above, by setting the selective reflection center wavelength of the cholesteric liquid crystal layer to be a wavelength corresponding to the color of the wall, in a state where the liquid crystal display does not display an image, the appearance of the ambient display is integrated with the wall due to the action of the cholesteric liquid crystal layer.

The λ/4 plate converts an image of linearly polarized light emitted from the liquid crystal display into circularly polarized light in a turning direction (sense) opposite to that of circularly polarized light to be reflected from the cholesteric liquid crystal layer. Accordingly, in a case where the liquid crystal display displays an image, the display image transmits through the cholesteric liquid crystal layer and is displayed in a plane of the wall.

Here, the wall typically has a mat tone such as a delustered surface instead of having a mirror surface and a metal tone. On the other hand, the cholesteric liquid crystal layer specularly reflects light in the selective reflection wavelength range and thus has a metal tone.

Accordingly, in a case where the ambient display is prepared using the cholesteric liquid crystal layer, the appearance is integrated with the wall. Therefore, it is preferable that the cholesteric liquid crystal layer has a mat tone having a certain degree of haze instead of a metal tone.

However, in a case where the cholesteric liquid crystal layer has a certain degree of haze, an image displayed by the liquid crystal display is blurred due to the haze of the cholesteric liquid crystal layer.

On the other hand, the optical element 10 according to the embodiment of the present invention has fine unevenness on the surface in the reference form. That is, the surface is the liquid crystal layer 16 and the polymer layer 18. Accordingly, in a case where the optical element 10 according to the embodiment of the present invention is used as the decorative film of the ambient display, in a state where the liquid crystal display 42 is turned off, the liquid crystal layer 16 of the optical element 10 can be set to the reference form to be integrated with the wall having a mat tone.

On the other hand, in a case where the liquid crystal display 42 is turned on to display an image, the liquid crystal layer 16 of the optical element 10 is in the first form. As a result, the unevenness of the surface of the optical element 10 is removed. Therefore, the image of the liquid crystal display 42 is not blurred by the optical element 10, and a clear image can be displayed.

That is, by using the optical element 10 according to the embodiment of the present invention, the following ambient display can be realized. In a state where the liquid crystal display does not display an image, the ambient display is integrated with the wall such that the presence thereof is inconspicuous. In a case where the liquid crystal display displays an image, a clear image can be displayed.

As described above, the liquid crystal layer 16 of the optical element 10 according to the embodiment of the present invention has the uneven surface where irregular unevenness is formed, that is, the liquid crystal layer 16 has the film thickness distribution in the reference form.

The film thickness distribution of the liquid crystal layer 16 is not particularly limited. The film thickness distribution of the liquid crystal layer 16 in the reference form satisfies preferably "1.03<(in-plane maximum film thickness/in-plane minimum film thickness)<100", more preferably "1.2<(in-plane maximum film thickness/in-plane minimum film thickness)<10", and still more preferably "1.5<(in-plane maximum film thickness/in-plane minimum film thickness)<3".

It is preferable that the film thickness distribution of the liquid crystal layer 16 in the reference form is more than 1.03, for example, from the viewpoint that optical characteristics caused by the liquid crystal layer 16 having the film thickness distribution can be sufficiently obtained and the viewpoint that the above-described pattern can be suitably formed in a case where the optical element 10 is used, for example, as a viewing angle deflection element.

It is preferable that the film thickness distribution is less than 100, for example, from the viewpoint that the whitening of the optical element 10 by distortion can be suppressed.

In the optical element 10 according to the embodiment of the present invention, the film thickness distribution of the liquid crystal layer 16 is measured as follows.

In any cross section of the optical element 10 (liquid crystal layer 16), a maximum value and a minimum value of film thickness in a freely selected in-plane 1 mm region are measured to calculate (in-plane maximum film thickness/in-plane minimum film thickness). This calculation of (in-plane maximum film thickness/in-plane minimum film thickness) is performed on 10 freely selected cross sections, and the average value thereof is obtained as the film thickness distribution of the liquid crystal layer 16 of the optical element 10.

In addition to the above-described cholesteric liquid crystal layer and the like, the cross section described herein refers to a cross section of a layer or a laminate in a thickness direction unless specified otherwise.

In the optical element 10 according to the embodiment of the present invention, a difference between the film thickness distribution of the liquid crystal layer 16 in the reference form and the film thickness distribution of the liquid crystal layer 16 in the first form is not particularly limited.

In the present invention, in a case where the film thickness distribution of the liquid crystal layer in the reference form is represented by A and the film thickness distribution of the liquid crystal layer in the first form is represented by B, it is preferable that "1.1<A/B<100" is satisfied, it is more preferable that "1.2<A/B<10" is satisfied, and it is still more preferable that "1.5<A/B<3" is satisfied.

It is preferable that A/B is more than 1.1, for example, from the viewpoint that, for example, in a case where the optical element 10 is used as a viewing angle deflection element after setting the difference between the reference form and the first form to be sufficiently large, a difference between display at a wide viewing angle and display at a narrow viewing angle of an image observed from an oblique direction can be increased. In addition, in a case where the optical element 10 is cholesterically aligned to have the same color as that of an indoor wall surface and is used on the surface of the ambient display, the surface haze caused by the unevenness in the reference form matches with the text of the white mat wall W such that the presence of the display that is turned off can be effectively made to be inconspicuous, and when the display is turned on to enter the first form, the unevenness can be removed to eliminate the haze such that the image of the display can be clearly seen. It is preferable that A/B is more than 1.1, for example, from the viewpoint that this difference can be increased.

It is preferable that the A/B is less than 100, for example, from the viewpoint that the whitening of the optical element 10 by distortion can be suppressed.

The optical element 10 according to the embodiment of the present invention can be manufactured using various methods. Preferable examples of the manufacturing method include a method conceptually shown in FIG. 6.

In this manufacturing method, first, an organic film or the like is formed on one surface of the support 12, and a well-known treatment such as a rubbing treatment for forming an alignment film is performed thereon. As a result, the alignment film 14 is formed. As a method of forming the organic film, for example, a well-known method such as an application method corresponding to a material for forming the organic film may be used.

Next, a liquid crystal composition for forming liquid crystal layer 16 is applied to a surface of the alignment film 14. As described above, it is preferable that a well-known method using a bar coater or the like is used as the application method.

Next, optionally, a solvent of the liquid crystal composition is evaporated, dried, and heated. As a result, the liquid crystal compound is aligned, and the liquid crystal layer 16 is formed.

On the other hand, a coating liquid for forming the polymer layer 18 in which a polymer is dissolved in pure water or the like is prepared. This coating liquid is applied to a surface of the liquid crystal layer 16 to form a coating film 18a. As a result, the laminate enters a state conceptually shown on the left side of FIG. 6.

Next, the coating film 18a for forming the polymer layer 18 is heated and dried. The liquid crystal compound in the liquid crystal layer 16 (liquid crystal composition) may be aligned by heating and drying the coating film 18a.

Figure 6:
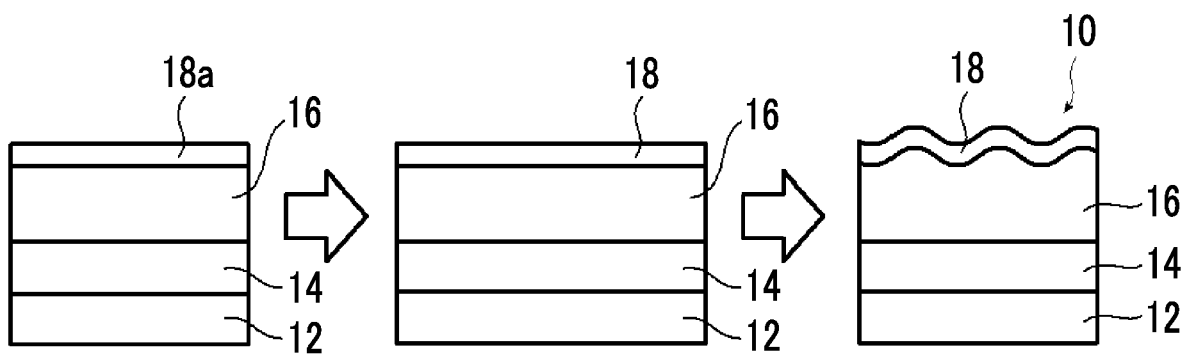
FIG. 6 is a conceptual diagram showing an example of a method of manufacturing the optical element according to the present invention.

Due to this heating and drying, the polymer layer 18 and the like expands and increases in size in the plane direction as conceptually shown at the center of FIG. 6. In addition, the liquid crystal layer 16 is not cured and thus also increases in size in the plane direction following the expansion of the polymer layer 18.

When the polymer layer 18 is formed by heating and drying and subsequently is cooled to normal temperature, the expanded polymer layer 18 is about to return to the original size.

However, the polymer layer 18 is laminated on the liquid crystal layer 16, and thus cannot contract simply. As a result, the contracted polymer layer 18 is wrinkled to enter a state where irregular unevenness is two-dimensionally formed.

The liquid crystal layer 16 is not cured. Therefore, as conceptually shown on the right side of FIG. 6, the surface of the liquid crystal layer 16 on the polymer layer 18 side follows the unevenness of the polymer layer 18 such that unevenness is two-dimensionally and spontaneously formed. On the other hand, the surface of the liquid crystal layer 16 on the alignment film 14 side is supported by the support 12, and thus has flatness corresponding to the surface of the support 12 (alignment film 14).

During the manufacturing of the optical element 10 according to the embodiment of the present invention, the liquid crystal compound of the liquid crystal layer 16 is not cured (not crosslinked).

As a result, the optical element 10 in the reference form where the liquid crystal layer 16 has the uneven surface is prepared. That is, in a standby state, this optical element is in the reference form where the liquid crystal layer 16 has the uneven surface.

As described above, in the optical element 10 according to the embodiment of the present invention, the liquid crystal compound of the liquid crystal layer 16 is not cured. Therefore, by stretching the optical element 10 or by releasing the stretching, the optical element 10 is reversibly switchable between the reference form and the first form where the film thickness distribution is less than that of the reference form.

In the optical element according to the embodiment of the present invention, both the support 12 and the alignment film 14 are not essential components.

For example, the optical element according to the embodiment of the present invention may be an optical element including three layers including the alignment film 14, the liquid crystal layer 16, and the polymer layer 18 by peeling off the support 12 after forming the support 12, the alignment film 14, the liquid crystal layer 16, and the polymer layer 18 using the above-described manufacturing method to form the optical element 10 shown in FIG. 1.

Alternatively, the optical element according to the embodiment of the present invention may be an optical element including two layers including the liquid crystal layer 16 and the polymer layer 18 by peeling off the support 12 and the alignment film 14 after preparing the optical element 10 shown in FIG. 1.

Hereinabove, the optical element according to the embodiment of the present invention has been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Preparation of Support)

An elongated triacetyl cellulose film (manufactured by Fujifilm Corporation, TAC film) having a thickness of 60 μm was prepared.

The following alignment film coating liquid was prepared and was heated at 85° for 1 hour to dissolve the components while being stirred and was filtered through a 0.45 μm filter.

| Alignment film Coating Liquid | |
|---|---|
| PVA 203 (manufactured by Kuraray Co., Ltd., polyvinyl alcohol) | 2.4 parts by mass |
| Pure water | 97.6 parts by mass |

The prepared alignment film coating liquid was applied to the TAC film while adjusting the application amount such that the film thickness after drying was 0.5 μm, and was dried at 100° C. for 2 minutes.

The dried coating film was rubbed to prepare a film-shaped support including the alignment film. A rubbing direction was parallel to a longitudinal direction of the film.

(Preparation of Liquid Crystal Composition 1)

The following liquid crystal composition 1 was prepared, was heated at 50° C. for 1 hour to dissolve the components, and was filtered through a 0.45 μm filter.

| Liquid Crystal Composition 1 | |
|---|---|
| Discotic liquid crystal compound (compound 101) | 80 parts by mass |
| Discotic liquid crystal compound (compound 102) | 20 parts by mass |
| Additive 1 | 0.9 parts by mass |
| Additive 2 | 0.25 parts by mass |
| Chiral agent 1 | 3.0 parts by mass |
| Methyl ethyl ketone | 400 parts by mass |

Compound 101

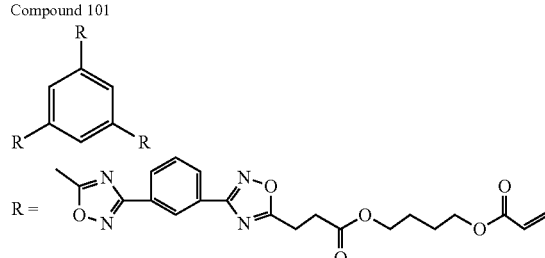

Compound 102

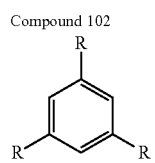

Liquid Crystal Composition 1

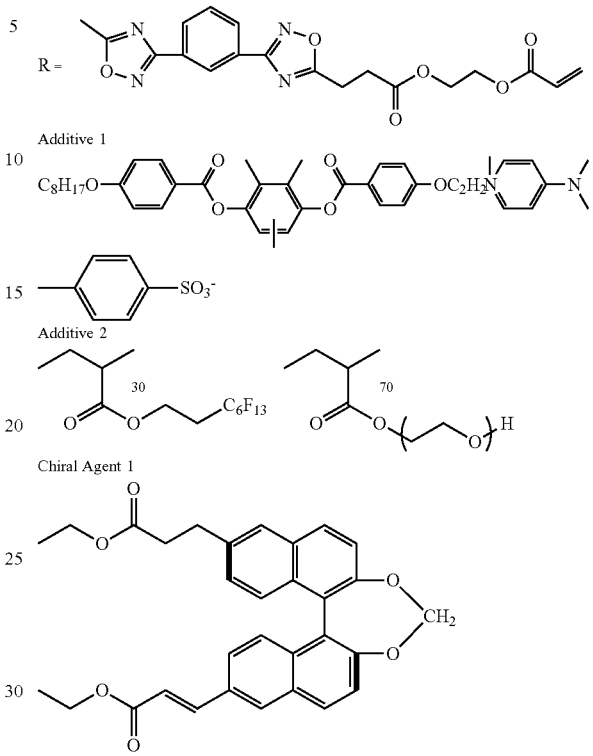

(Preparation of Optical Element)

The support where the alignment film was formed was cut in a 18×25 cm quadrangular shape.

The prepared liquid crystal composition 1 was applied to a surface of the alignment film such that the average film thickness after drying was 4 μm, a solvent was dried in a continuous heating step from room temperature to 100° C., and the coating film was further heated in a drying zone at 100° C. for about 90 seconds. Next, the coating film was cooled to normal temperature, and a liquid crystal layer in which the liquid crystal compound that was cholesterically aligned was formed.

The following polymer layer coating liquid was prepared and was heated at 85° for 1 hour to dissolve the components while being stirred and was filtered through a 0.45 μm filter.

| Polymer Layer Coating Liquid | |
|---|---|
| PVA 203 (manufactured by Kuraray Co., Ltd., polyvinyl alcohol) | 2.4 parts by mass |
| Pure water | 97.6 parts by mass |

The polymer layer coating liquid was applied to the formed liquid crystal layer while adjusting the application amount such that the film thickness after drying was 0.2 μm. Next, the coating film was dried at 100° C. for 2 minutes.

In a case where the coating film was cooled to normal temperature after drying, a spontaneous uneven structure having a unique pattern was formed on the surface of the liquid crystal layer. As a result, the optical element in the reference form where the liquid crystal layer had the uneven surface in a typical state was prepared.

It was able to be verified that, by heating the optical element to 50° C., the uneven structure of the liquid crystal layer was removed such that the liquid crystal layer was in the first form. In addition, it was also able to be verified that, by cooling the optical element to normal temperature, the uneven structure was formed such that the optical element returned to the reference form.

Further, four sides were held, and two sides (for example, an upper side and a left side) adjacent to each other were stretched such that the length increased by 2%. As a result, it was able to be verified that, with the stretching by 2%, the uneven structure of the liquid crystal layer was removed such that the liquid crystal layer was in the first form. In addition, it was also verified that, by releasing the stretching, the optical element returned to the original size, the uneven structure was formed, and the optical element returned to the reference form.

In addition, the support, the alignment film, and the polymer layer were peeled off, and an in-plane retardation (Re) and a thickness-direction retardation (Rth) of the liquid crystal layer at a wavelength of 550 nm were measured. As a result, Re(550) was 0 nm, and Rth(550) was 520 nm. A retardation value was measured using AxoScan (manufactured by Axometrics, Inc.).

In addition, in a case where the measured by optical trap using a device in which a large integrating sphere device (ILV-471, manufactured by JASCO Corporation) was attached to a spectrophotometer (V-550, manufactured by JASCO Corporation), a wavelength at which the transmittance with respect to light from the normal direction is minimum, that is, a selective reflection center wavelength was 740 nm.

Example 2

An optical element was prepared using the same method as that of Example 1, except that the polymer layer coating liquid was applied such that the thickness of the polymer layer during the formation of the polymer layer was 11 μm.

Example 3

An optical element was prepared using the same method as that of Example 1, except that the polymer layer coating liquid was applied such that the thickness of the polymer layer during the formation of the polymer layer was 10 μm.

Example 4

Further, 10 parts by mass of liquid crystal (5CB, manufactured by Tokyo Chemical Industry Co., Ltd.) was added to the liquid crystal composition 1 according to Example 1.

An optical element was prepared using the same method as that of Example 1, except that the liquid crystal was formed of the liquid crystal composition.

Example 5

Further, 12 parts by mass of liquid crystal (5CB, manufactured by Tokyo Chemical Industry Co., Ltd.) was added to the liquid crystal composition 1 according to Example 1.

An optical element was prepared using the same method as that of Example 1, except that the liquid crystal was formed of the liquid crystal composition.

Example 6

An optical element was prepared using the same method as that of Example 1, except that the polymer layer coating liquid was applied such that the thickness of the polymer layer during the formation of the polymer layer was 0.008 μm.

Example 7

An optical element was prepared using the same method as that of Example 1, except that the polymer layer coating liquid was applied such that the thickness of the polymer layer during the formation of the polymer layer was 0.010 μm.

Example 8

(Preparation of Support)

A triacetyl cellulose film (manufactured by Fujifilm Corporation, TAC film) having a thickness of 60 μm was prepared.

The following liquid crystal composition 2 was prepared, and a uniform solution was obtained.

| Liquid Crystal Composition 2 | |
|---|---|
| Discotic liquid crystal compound 101 | 80 parts by mass |
| Discotic liquid crystal compound 102 | 20 parts by mass |
| Discotic liquid crystal compound 201 (compound 201) | 5.6 parts by mass |
| Fluorine-based leveling agent F1 | 0.09 parts by mass |
| Toluene | 560 parts by mass |

Compound 201

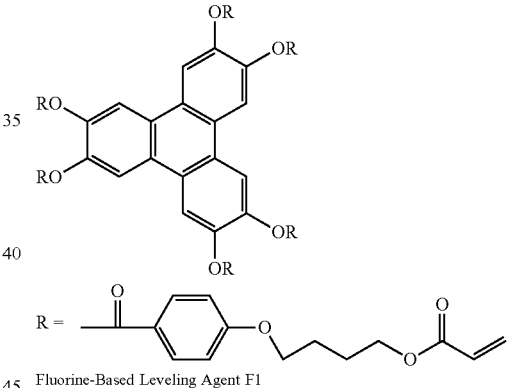

Fluorine-Based Leveling Agent F1

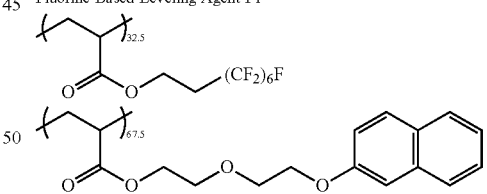

The TAC film was cut in a 18×25 cm quadrangular shape.

The liquid crystal composition 2 was applied to the TAC film that was cut in a quadrangular shape, and a solvent was dried in a continuous heating step from room temperature to 100° C. Next, the coating film was further heated in a drying zone at 100° C. for about 90 seconds and was cooled to normal temperature. As a result, a liquid crystal layer was formed.

By performing the subsequent steps using the same method as that of Example 1, a polymer layer was formed, and an optical element was obtained. By drying and cooling during the formation of the polymer layer, a spontaneous uneven structure having a unique pattern was formed on the surface of the liquid crystal layer as in Example 1. As a result, the optical element in the reference form where the liquid crystal layer had the uneven surface in a typical state was prepared.

In addition, it was verified that, by performing heating/cooling and stretching/releasing of the stretching using the same method as that of Example 1, the optical element was reversibly switchable between the reference form and the first form.

Example 9

An optical element was prepared using the same method as that of Example 1, except that the polymer layer coating liquid was applied such that the thickness of the polymer layer during the formation of the polymer layer was 11 μm.

Example 10

An optical element was prepared using the same method as that of Example 1, except that the polymer layer coating liquid was applied such that the thickness of the polymer layer during the formation of the polymer layer was 10 μm.

Example 11

Further, 10 parts by mass of liquid crystal (5CB, manufactured by Tokyo Chemical Industry Co., Ltd.) was added to the liquid crystal composition 1 according to Example 1.

An optical element was prepared using the same method as that of Example 1, except that the liquid crystal was formed of the liquid crystal composition.

Example 12

Further, 12 parts by mass of liquid crystal (5CB, manufactured by Tokyo Chemical Industry Co., Ltd.) was added to the liquid crystal composition 1 according to Example 1. An optical element was prepared using the same method as that of Example 1, except that the liquid crystal was formed of the liquid crystal composition.

[Evaluation]

The following measurement was performed on each of the prepared optical elements.

(Film Thickness Distribution of Liquid Crystal Layer (Reference Form and First Form)

A cross section of the prepared optical element was cut, the thickness of the liquid crystal layer in a freely selected 1 mm region was observed with an optical SEM from a cross-sectional direction to calculate a film thickness distribution (maximum film thickness/minimum film thickness) of the liquid crystal layer from a maximum value and a minimum value of film thickness of the liquid crystal layer in the 1 mm region.

By performing this measurement on ten freely selected cross sections, the average value thereof was obtained as the measurement result of the film thickness distribution of the organic layer in each of the optical elements.

(Ratio of Helical Pitch of Convex Portions/Helical Pitch of Concave Portions (Helical Pitch Ratio))

Regarding each of the optical elements according to Examples 1 to 5, in a case where a cross section was cut, in convex portions and concave portions adjacent to each other, a ratio (convex portion/concave portion) between helical pitches of the cholesteric liquid crystalline phase was calculated.

The helical pitch was twice the distance between bright lines with respect to bright lines and dark lines of a cholesteric liquid crystalline phase observed in a case where the liquid crystal layer was observed with a SEM from the cross-sectional direction.

By performing the measurement of the helical pitch ratio on ten freely selected points, the average value thereof was obtained as the measurement result. The measurement of the helical pitch was performed in the reference form.

(Visibility of Image Observed from Oblique Direction in Narrow Viewing Angle State (Image Visibility))

As shown in FIG. 3, a liquid crystal display including a liquid crystal panel for image display, the prepared optical element, a first polarizer for switching, a liquid crystal cell for switching, and a second polarizer for switching was prepared.

Directions of transmission axes of an emission side polarizer of the liquid crystal panel for image display and the polarizers for switching (the first and second polarizers) were matched to each other (parallel nicols). In addition, a major axis direction of the liquid crystal cell for switching was matched to the transmission axes of the polarizers using a rod-like liquid crystal compound.

Regarding this liquid crystal display, in a case where a display image was observed by visual inspection from a direction of a polar angle of 30° in a narrow viewing angle state where the visual field from an oblique direction was hindered, the legibility of characters displayed by the display was evaluated by performing a sensory evaluation of 0 to 6 points (as the point increases, the legibility decreases) and obtaining a total point of the evaluation by 20 persons. The evaluation was performed both in the reference form and the first form.

The results are shown in the following table.

TABLE 1

| | Polymer Layer | Addition Amount of Liquid Crystal Layer 5CB [Part(s) by Mass] | Film Thickness of Polymer Layer [μm] | Film Thickness Distribution of Reference Form | Ratio between Film Thickness Distributions of Reference Form and First Form (A/B) | Helical Pitch Ratio | Alignment of Liquid Crystal Layer | Visibility of Oblique Observation | |
|---|---|---|---|---|---|---|---|---|---|
| | | | | | | | | Reference Form | First Form |
| Example 1 | PVA | 0.0 | 0.200 | 2.00 | 2.0 | 2.0 | Cholesteric | 80 | 20 |
| Example 2 | PVA | 0.0 | 11.0 | 1.03 | 1.1 | 1.05 | Cholesteric | 60 | 20 |
| Example 3 | PVA | 0.0 | 10.0 | 1.04 | 1.2 | 1.06 | Cholesteric | 70 | 20 |
| Example 4 | PVA | 10.0 | 0.200 | 99 | 95 | 99 | Cholesteric | 70 | 20 |
| Example 5 | PVA | 12.0 | 0.200 | 105 | 105 | 105 | Cholesteric | 60 | 20 |
| Example 6 | PVA | 0.0 | 0.008 | 2.25 | 2.0 | 2.2 | Cholesteric | 50 | 20 |
| Example 7 | PVA | 0.0 | 0.010 | 2.20 | 2.0 | 2.2 | Cholesteric | 60 | 20 |
| Example 8 | PVA | 0.0 | 0.200 | 2.00 | 2.0 | — | Homogeneous | 70 | 20 |

TABLE 1-continued

|  | Polymer Layer | Addition Amount of Liquid Crystal Layer 5CB [Part(s) by Mass] | Film Thickness of Polymer Layer [μm] | Film Thickness Distribution of Reference Form | Ratio between Film Thickness Distributions of Reference Form and First Form (A/B) | Helical Pitch Ratio | Alignment of Liquid Crystal Layer | Visibility of Oblique Observation | |
|---|---|---|---|---|---|---|---|---|---|
|  |  |  |  |  |  |  |  | Reference Form | First Form |
| Example 9 | PVA | 0.0 | 11.0 | 1.03 | 1.1 | — | Homogeneous | 50 | 20 |
| Example 10 | PVA | 0.0 | 10.0 | 1.04 | 1.2 | — | Homogeneous | 60 | 20 |
| Example 11 | PVA | 10.0 | 0.200 | 99 | 95 | — | Homogeneous | 60 | 20 |
| Example 12 | PVA | 12.0 | 0.200 | 105 | 105 | — | Homogeneous | 50 | 20 |

All the layer configurations of the optical elements were support/alignment film/liquid crystal layer/polymer layer.

As can be seen from the above table, in a case where the optical element according to the embodiment of the present invention is used as an element for switching between viewing angles in a liquid crystal display, the visibility of an image observed from an oblique direction in a narrow viewing angle state can be suitably reduced, and the visibility can be changed by switching between the reference form and the first form.

In particular, as shown in Examples 2 to 5 and Examples 9 to 12, by setting the film thickness distribution in the reference form to be in a range of 1.03 to 100, the visibility of an image observed from an oblique direction in a narrow viewing angle of the liquid crystal display in the reference form can be suitably reduced.

As can be seen from the above results, the effects of the present invention are obvious.

The optical element according to the embodiment of the present invention can be suitably used as an element for switching between viewing angles in various devices such as a liquid crystal display.

EXPLANATION OF REFERENCES

10: optical element
12: support
14: alignment film
16: liquid crystal layer
18: polymer layer
18a: coating film
20, 42: liquid crystal display
24: liquid crystal panel
26: liquid crystal cell for switching
26a: liquid crystal compound
28a: first polarizer
28b: second polarizer
30: liquid crystal cell for display
32: incidence side polarizer
34: emission side polarizer
40: ambient display
46: λ/4 plate
W: wall

What is claimed is:

1. An optical element comprising:
a liquid crystal layer where a liquid crystal compound is aligned; and
a polymer layer that is laminated on the liquid crystal layer,
wherein the optical element is reversibly switchable between a reference form and a first form where a film thickness distribution of the liquid crystal layer is less than that of the reference form, and
the film thickness distribution of the liquid crystal layer in the reference form satisfies "1.03<(in-plane maximum film thickness/in-plane minimum film thickness)<100".

2. The optical element according to claim 1, wherein a film thickness of the polymer layer is 0.01 to 100 μm.

3. The optical element according to claim 1, wherein in the liquid crystal layer, the liquid crystal compound is homogeneously aligned.

4. The optical element according to claim 1, wherein the liquid crystal layer has unevenness on only one main surface in the reference form.

5. An optical element comprising:
a liquid crystal layer where a liquid crystal compound is aligned; and
a polymer layer that is laminated on the liquid crystal layer,
wherein the optical element is reversibly switchable between a reference form and a first form where a film thickness distribution of the liquid crystal layer is less than that of the reference form, and
in a case where the film thickness distribution of the liquid crystal layer in the reference form is represented by A and the film thickness distribution of the liquid crystal layer in the first form is represented by B, "1.1<A/B<100" is satisfied.

6. The optical element according to claim 5, wherein a film thickness of the polymer layer is 0.01 to 100 μm.

7. The optical element according to claim 5, wherein in the liquid crystal layer, the liquid crystal compound is cholesterically aligned.

8. The optical element according to claim 7, wherein depending on the film thickness distribution of the liquid crystal layer, as the film thickness of the liquid crystal layer increases, a helical pitch of the cholesterically aligned liquid crystal compound increases.

9. The optical element according to claim 8, wherein in uneven portions adjacent to each other, a ratio of a helical pitch of convex portions to a helical pitch of concave portions satisfies "1.05<(convex portions/concave portions)<100".

10. An optical element comprising:
a liquid crystal layer where a liquid crystal compound is aligned; and
a polymer layer that is laminated on the liquid crystal layer,
wherein the optical element is reversibly switchable between a reference form and a first form where a film thickness distribution of the liquid crystal layer is less than that of the reference form, in the liquid crystal layer, the liquid crystal compound is cholesterically aligned, and depending on the film thickness distribution of the liquid crystal layer, as the film thickness of the liquid crystal layer increases, a helical pitch of the cholesterically aligned liquid crystal compound increases.

11. The optical element according to claim 10, wherein in uneven portions adjacent to each other, a ratio of a helical pitch of convex portions to a helical pitch of concave portions satisfies "1.05<(convex portions/concave portions)<100".

* * * * *